United States Patent
Sauseda et al.

(10) Patent No.: US 10,520,006 B1
(45) Date of Patent: Dec. 31, 2019

(54) FASTENER PROTECTION CAPS AND METHODS

(71) Applicants: Jimmie Sauseda, Carencro, LA (US); Daniel R. Lovett, Haughton, LA (US)

(72) Inventors: Jimmie Sauseda, Carencro, LA (US); Daniel R. Lovett, Haughton, LA (US)

( * ) Notice: Subject to any disclaimer, the term of this patent is extended or adjusted under 35 U.S.C. 154(b) by 151 days.

(21) Appl. No.: 15/670,070

(22) Filed: Aug. 7, 2017

(51) Int. Cl.
*A47G 3/00* (2006.01)
*F16B 37/14* (2006.01)
*F16B 33/00* (2006.01)

(52) U.S. Cl.
CPC ............ *F16B 37/14* (2013.01); *F16B 33/004* (2013.01)

(58) Field of Classification Search
USPC ............ 411/373–376, 372.5, 372.6; 118/505
See application file for complete search history.

(56) References Cited

U.S. PATENT DOCUMENTS

| | | | | |
|---|---|---|---|---|
| 3,393,597 A * | 7/1968 | Hoaglund | ............ | C25D 11/022 118/505 |
| 4,582,462 A | 4/1986 | Thiel | | |
| 4,656,058 A * | 4/1987 | Stark | ........................ | B05B 12/20 427/282 |
| 4,695,099 A * | 9/1987 | Klein | ........................ | B60B 1/041 301/104 |
| 4,695,486 A * | 9/1987 | Stark | ........................ | B05D 1/32 427/282 |
| 4,784,555 A | 11/1988 | Cantrell | | |
| 4,799,842 A * | 1/1989 | Kreider | .................... | F16B 37/14 411/171 |
| 4,993,902 A | 2/1991 | Hellon | | |
| 5,082,409 A * | 1/1992 | Bias | ........................ | F16B 37/14 411/372.5 |
| 5,205,312 A * | 4/1993 | Jerman | ...................... | E03B 9/06 137/15.02 |
| 5,810,532 A | 9/1998 | Huang | | |
| 6,135,691 A | 10/2000 | Nadarajah et al. | | |
| 6,299,951 B1 * | 10/2001 | Dauner | ................... | B05B 12/30 428/35.7 |
| 6,318,942 B1 | 11/2001 | Wieczorek | | |
| 7,004,700 B2 * | 2/2006 | Wilson | ..................... | F16B 37/14 301/37.374 |
| 7,964,069 B2 * | 6/2011 | Bergmann | ............... | C25D 5/02 118/428 |
| 9,585,523 B1 | 3/2017 | Brannan | | |
| 2005/0100425 A1 * | 5/2005 | Wu | ........................ | F16B 37/14 411/372.5 |
| 2006/0283623 A1 * | 12/2006 | Dailey | ..................... | F16B 37/14 174/138 D |
| 2014/0030042 A1 * | 1/2014 | Sugitani | ................... | F16B 37/14 411/429 |
| 2015/0343942 A1 | 12/2015 | Vaughn | | |

* cited by examiner

*Primary Examiner* — Gary W Estremsky
(74) *Attorney, Agent, or Firm* — R. Keith Harrison

(57) ABSTRACT

Fastener protection caps which shield a fastener from material applied in sandblasting, painting and other processes include a cap wall including at least one side cap wall portion having a first wall end and a second wall end, and an end cap wall portion at the first wall end. A cap interior may be defined by the cap wall. The cap interior may be sized and configured to accommodate at least a portion of a mechanical fastener. At least one wall bevel may be provided at the second wall end of the cap wall. Fastener protection methods are also disclosed.

11 Claims, 8 Drawing Sheets

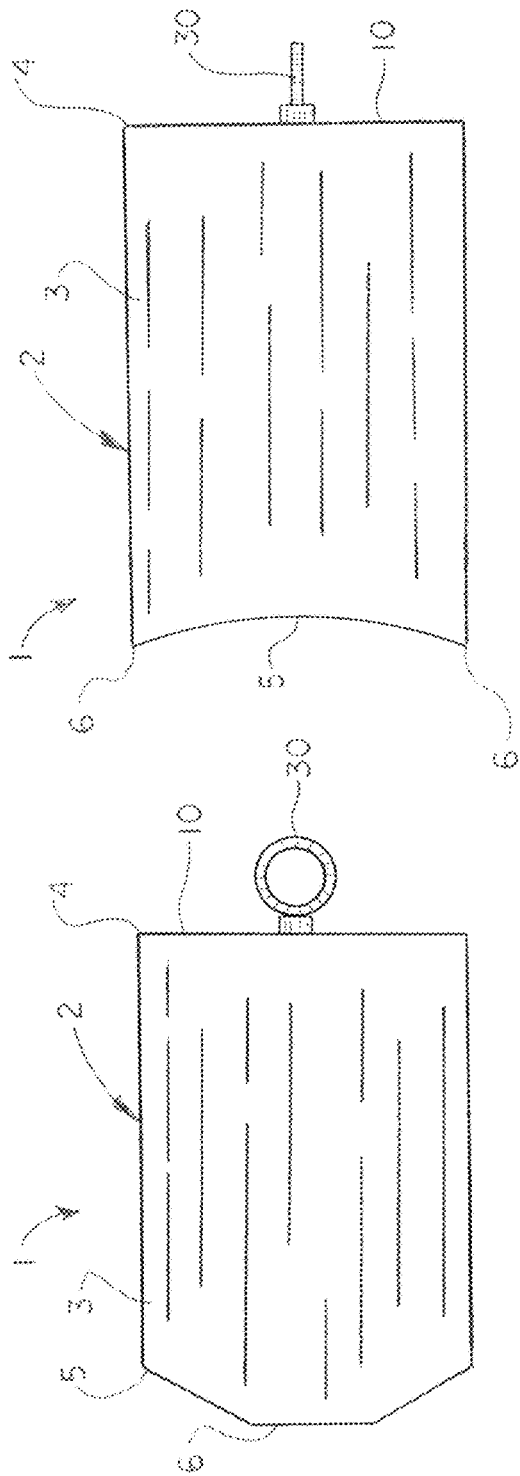
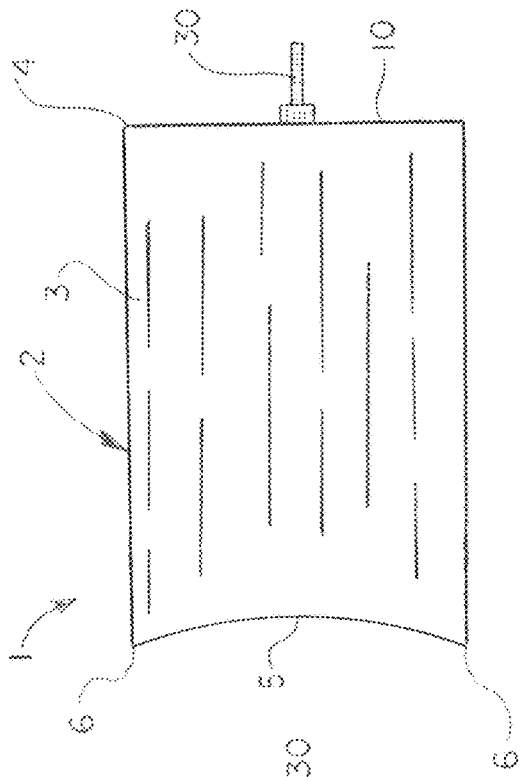
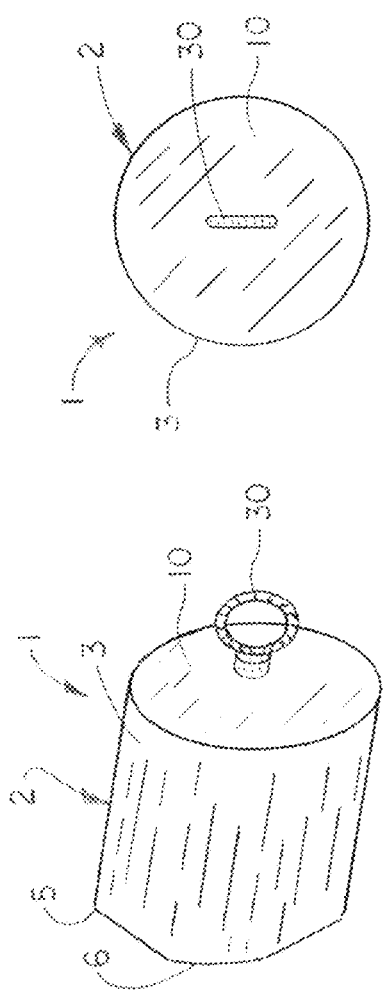
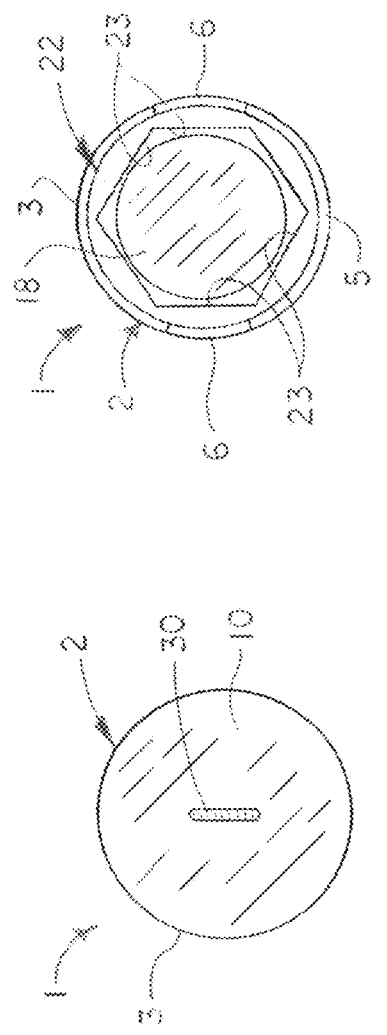
FIG. 3
FIG. 4
FIG. 5
FIG. 6
FIG. 7

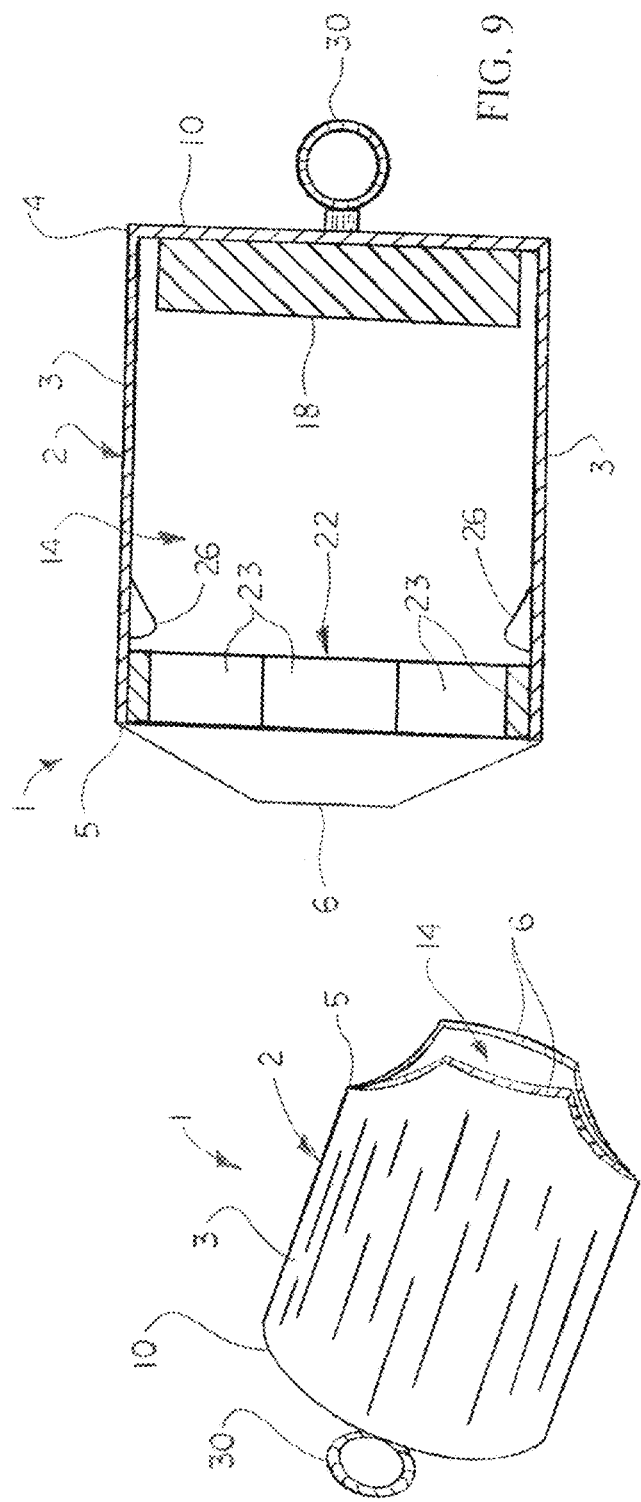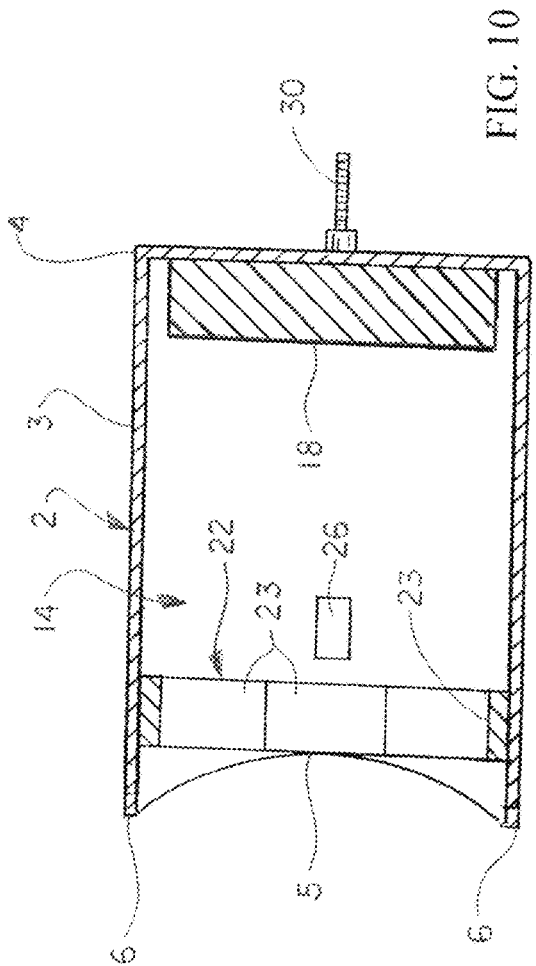

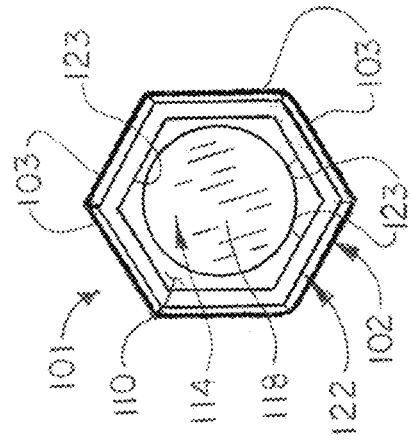
FIG. 13
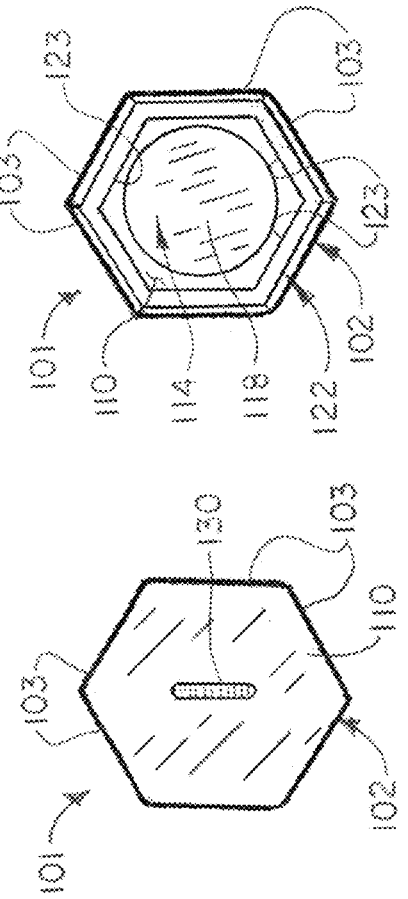
FIG. 14
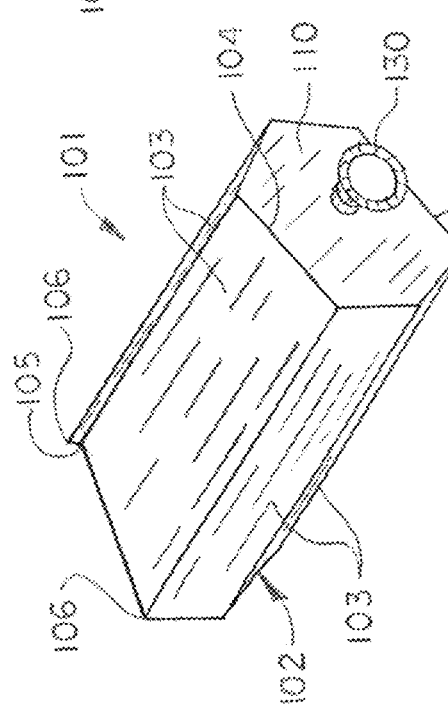
FIG. 15
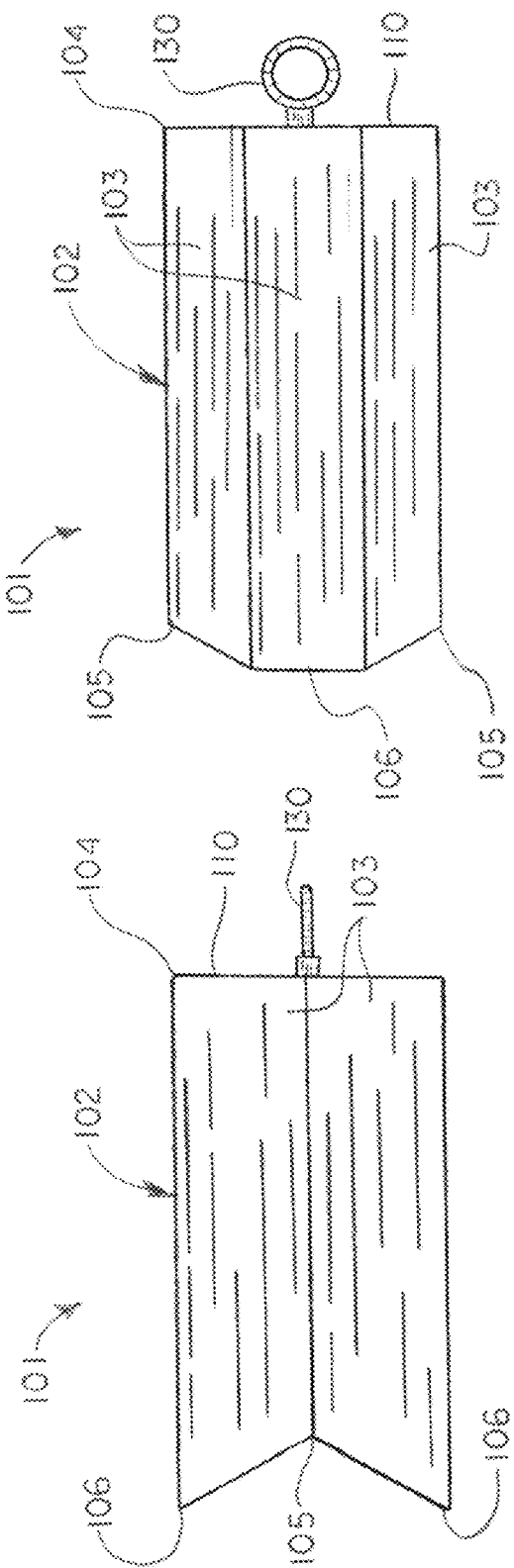
FIG. 16
FIG. 17

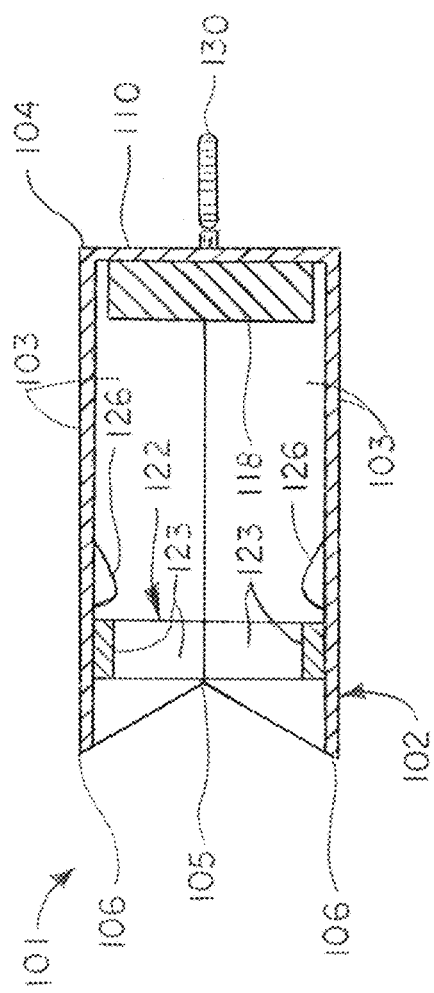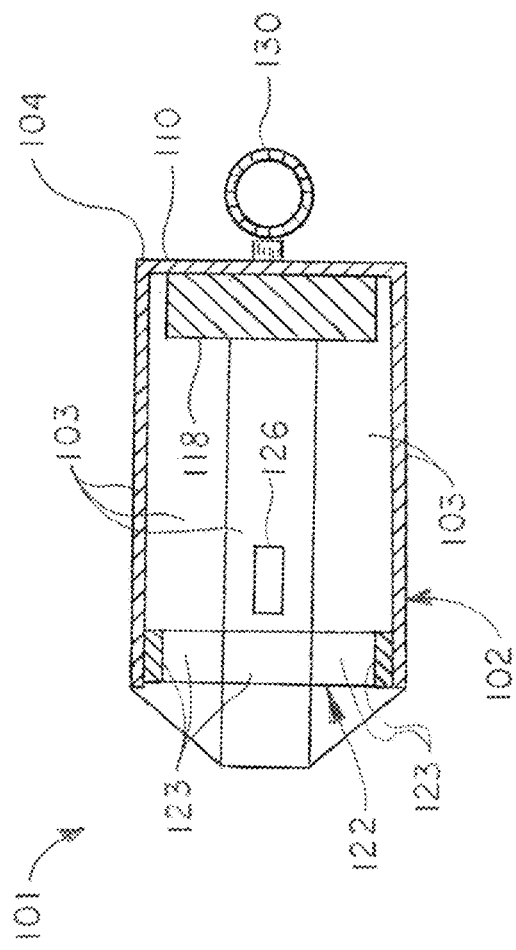

FASTENER PROTECTION CAPS AND METHODS

FIELD

Illustrative embodiments of the disclosure are generally directed to mechanical fasteners such as nuts and bolts. More particularly, illustrative embodiments of the disclosure are directed to fastener protection caps and methods which shield a fastener from material applied in sandblasting, painting and other processes.

SUMMARY

Illustrative embodiments of the disclosure are generally directed to fastener protection caps which shield a fastener from material applied in sandblasting, painting and other processes. An illustrative embodiment of the fastener protection caps includes a cap wall including at least one side cap wall portion having a first wall end and a second wall end, and an end cap wall portion at the first wall end. A cap interior may be defined by the cap wall. The cap interior may be sized and configured to accommodate at least a portion of a mechanical fastener. At least one wall bevel may be provided at the second wall end of the cap wall.

Illustrative embodiments of the disclosure are further generally directed to methods of shielding at least one fastener on, adjacent to or protruding from a surface to be treated from at least one applied material applied to the surface. An illustrative embodiment of the fastener protection methods includes placing at least one fastener protection cap on the at least one fastener, the at least one fastener protection cap including a cap wall including at least one side cap wall portion having a first wall end and a second wall end, and an end cap wall portion at the first wall end; a cap interior defined by the cap wall, the cap interior accommodates at least a portion of the at least one mechanical fastener and at least one wall bevel at the second wall end of the cap wall; placing the at least one wall bevel against the surface to be treated; and applying the applied material to the surface.

BRIEF DESCRIPTION OF THE DRAWINGS

Illustrative embodiments of the disclosure will now be described, by way of example, with reference to the accompanying drawings, in which:

FIG. 3 is a front perspective view of an illustrative embodiment of the fastener protection caps;

FIG. 4 is a front view of the illustrative fastener protection cap;

FIG. 5 is a rear view of the illustrative fastener protection cap;

FIG. 6 is a side view of the illustrative fastener protection cap;

FIG. 7 is a side view of the illustrative fastener protection cap, rotated 90 degrees relative to the position illustrated in FIG. 6;

FIG. 8 is a rear perspective view of the illustrative fastener protection cap;

FIG. 9 is a longitudinal sectional view of the illustrative fastener protection cap oriented as illustrated in FIG. 6:

FIG. 10 is a longitudinal sectional view of the illustrative fastener protection cap oriented as illustrated in FIG. 7;

FIG. 13 is a front perspective view of an alternative illustrative embodiment of the fastener protection caps;

FIG. 14 is a front view of the illustrative fastener protection cap illustrated in FIG. 13;

FIG. 15 is a rear view of the illustrative fastener protection cap illustrated in FIG. 13;

FIG. 16 is a side view of the illustrative fastener protection cap illustrated in FIG. 13;

FIG. 17 is a side view of the illustrative fastener protection cap illustrated in FIG. 13, rotated 90 degrees relative to the position illustrated in FIG. 16;

FIG. 18 is a longitudinal sectional view of the illustrative fastener protection cap oriented as illustrated in FIG. 16;

FIG. 19 is a longitudinal sectional view of the illustrative fastener protection cap oriented as illustrated in FIG. 17.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
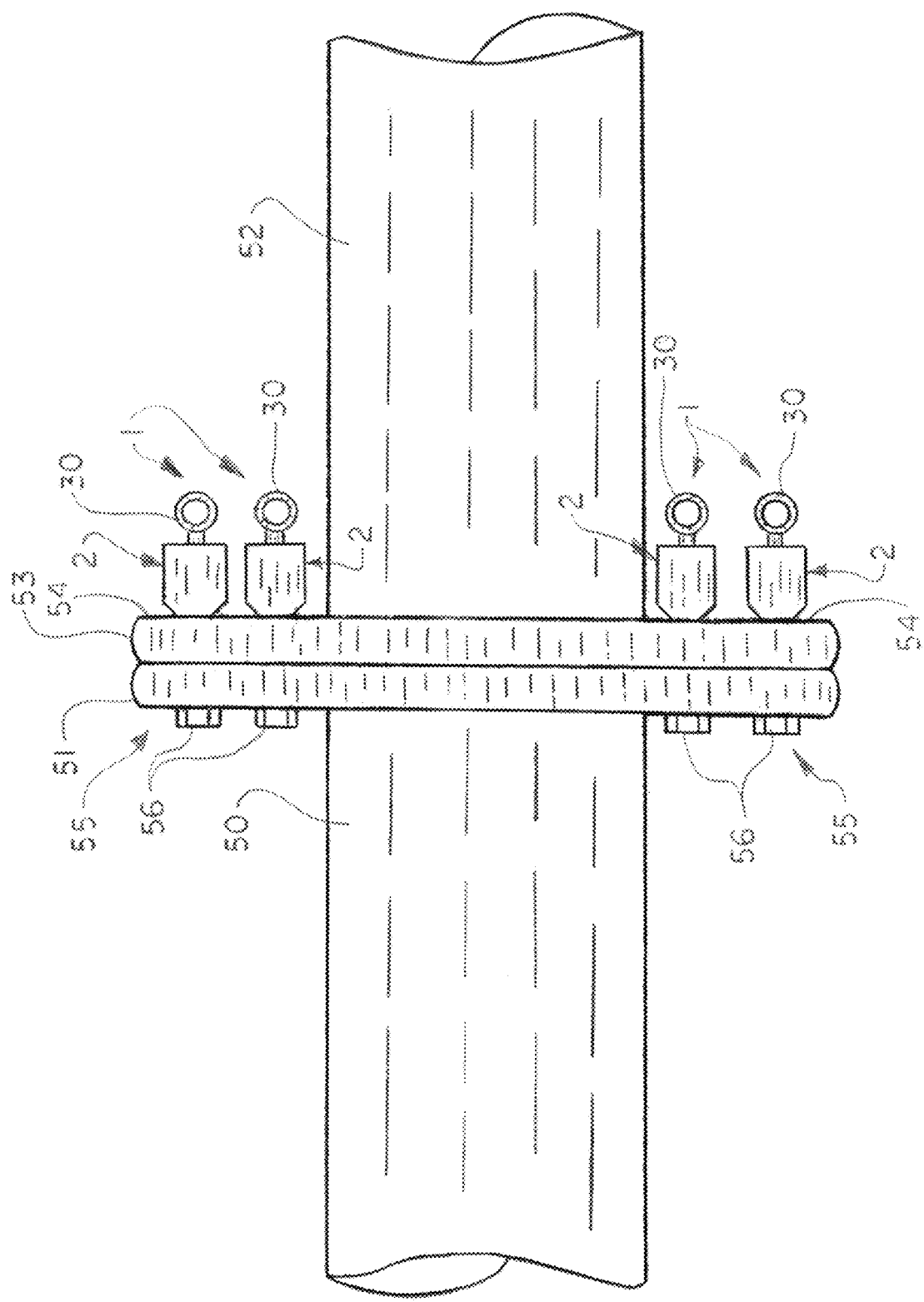
FIG. 1 is a side sectional view of a first conduit having a first conduit flange and a second conduit having a second conduit flange and multiple fasteners fastening the second conduit flange to the first conduit flange, more particularly illustrating multiple fastener protection caps according to an illustrative embodiment of the disclosure deployed in place on the respective fasteners to protect the fasteners from a material applied in sandblasting, painting and/or other processes in typical application of the fastener protection caps.
Figure 2:
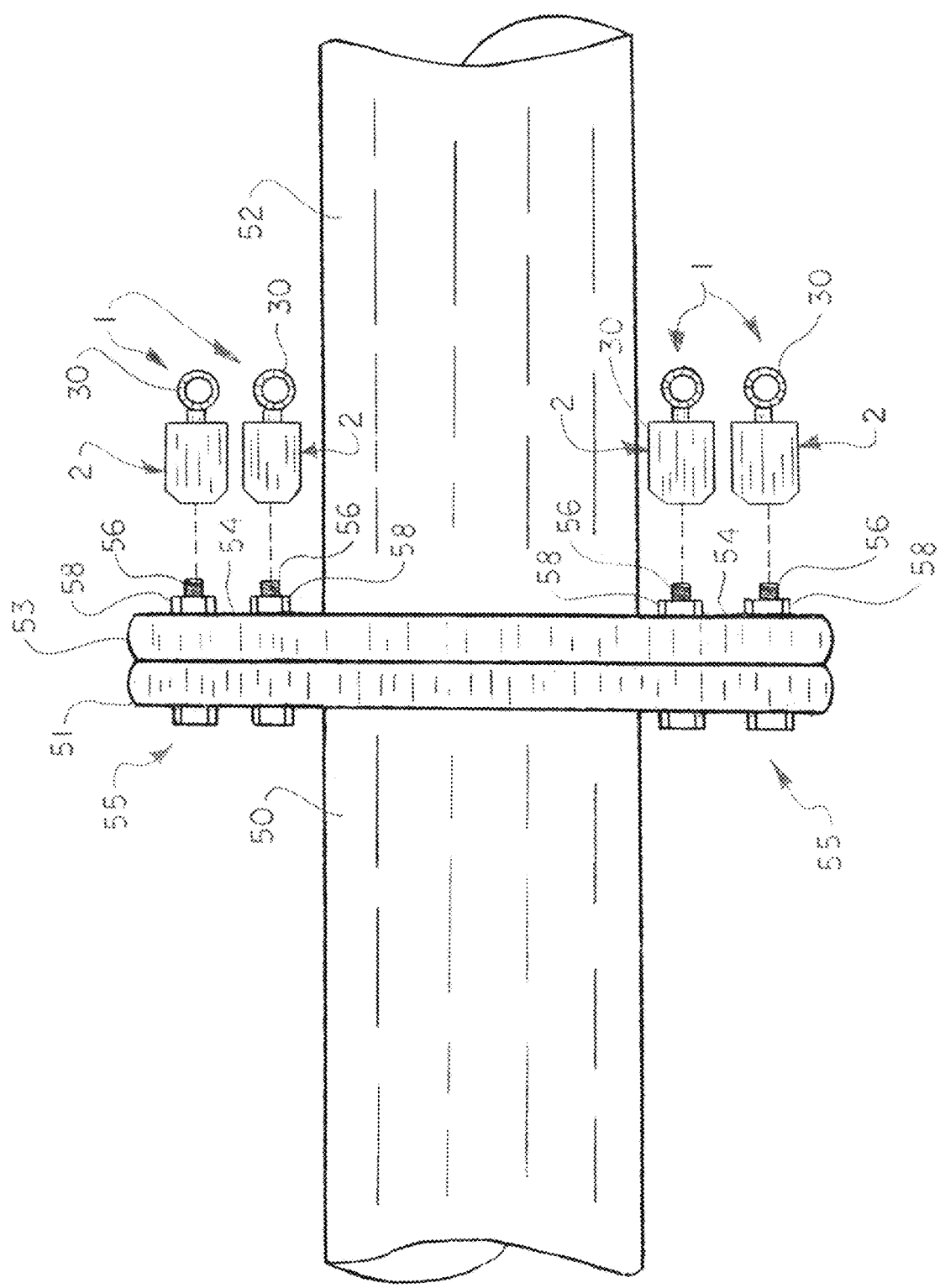
FIG. 2 is an exploded side sectional view of the first conduit and second conduit illustrated in FIG. 1, with the multiple fastener protection caps removed from the respective fasteners.
Figure 11:
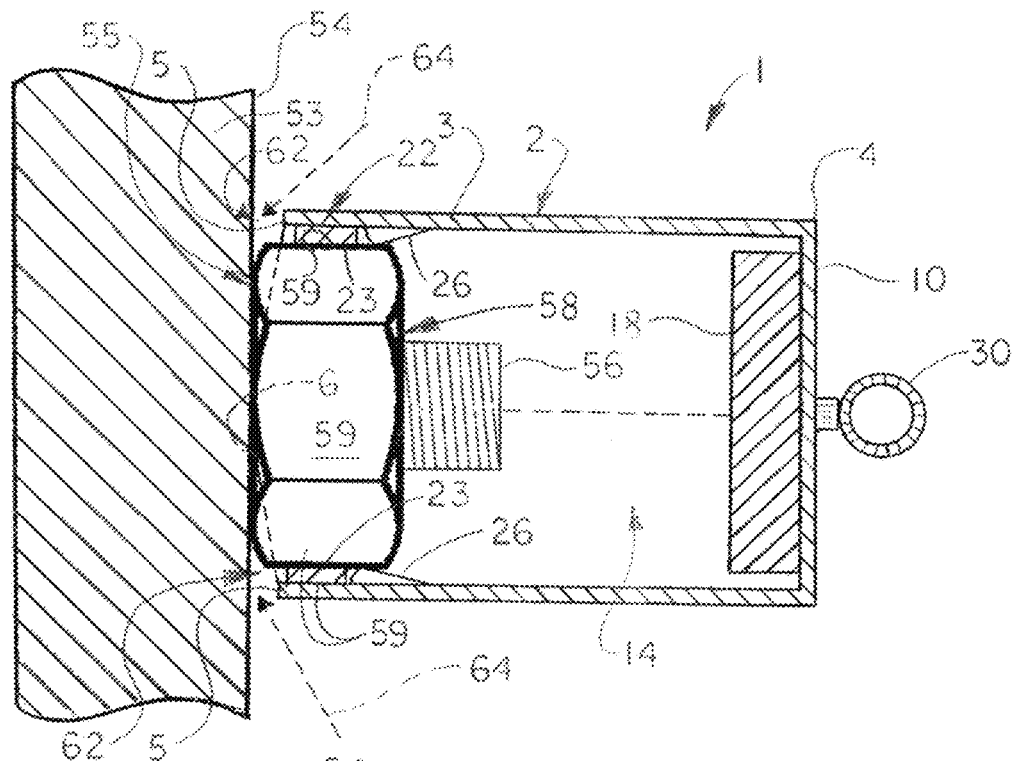
FIG. 11 is a longitudinal sectional view of the illustrative fastener protection cap oriented as illustrated in FIG. 9, deployed in place on a nut to shield and protect the nut from an applied material directed against a surface to be treated on an adjacent conduit flange in typical application of the fastener protection cap.
Figure 12:
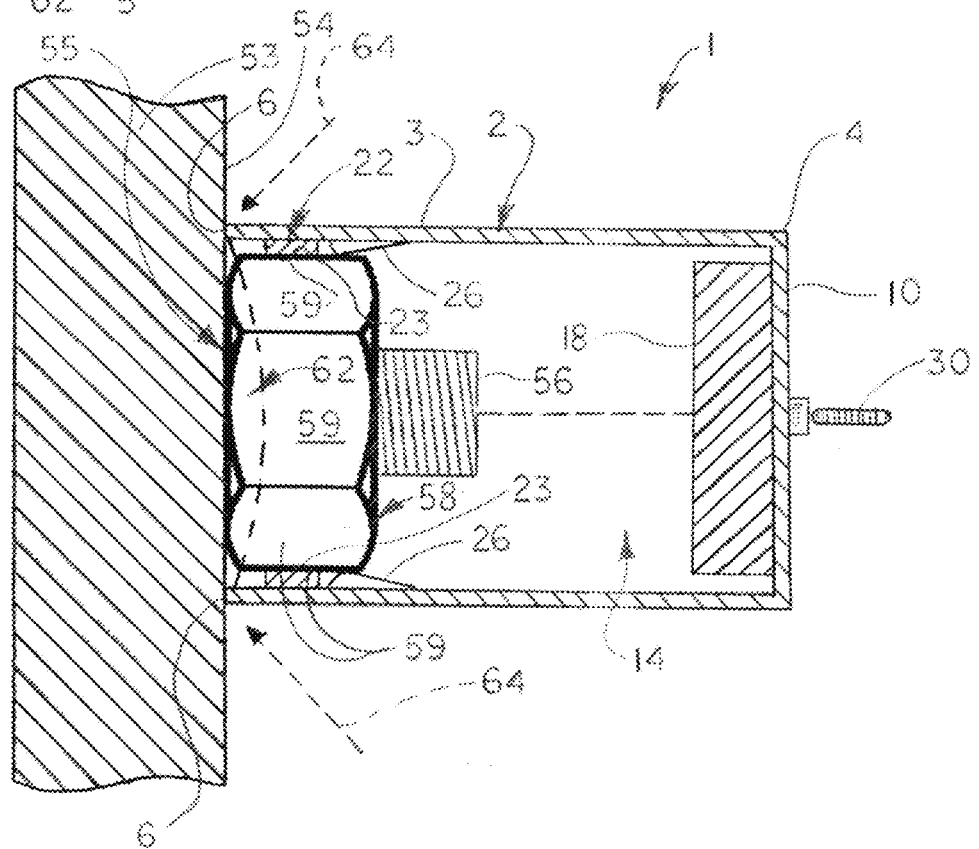
FIG. 12 is a longitudinal sectional view of the illustrative fastener protection cap oriented as illustrated in FIG. 10, deployed in place on the nut to shield and protect the nut from the applied material directed against the surface to be treated on the adjacent conduit flange in typical application of the fastener protection cap.

Referring initially to FIGS. 1 and 2 of the drawings, an illustrative embodiment of the fastener protection caps is generally indicated by reference numeral 1. As will be hereinafter further described, in typical application, at least one fastener protection cap 1 may be fitted over at least a portion of at least one mechanical fastener 55 such as a nut 58 (FIG. 2) which is threaded on a bolt 56. In some applications, the nut 58 may be a standard or conventional hex nut having six nut faces 59 (FIGS. 11 and 12). In some non-limiting applications, the bolt 56 and the nut 58 may secure a first conduit flange 51 of a first conduit 50 to a second conduit flange 53 of a second conduit 52 such that the second conduit 52 is secured in fluid communication with the first conduit 50. In other non-limiting applications, the mechanical fastener 55 may secure a pump flange (not illustrated) to a conduit (not illustrated). As will be hereinafter described, the fastener protection cap 1 may shield and protect the nut 58 and/or the bolt 56 of the fastener 55 from an applied material 64 (FIGS. 11 and 12) which is applied to a surface 54 to be treated on the first conduit flange 51 and/or the second conduit flange 52. The mechanical fastener 55 may protrude from or may be on or adjacent to the surface 54, and may thus otherwise be vulnerable to contact by the applied material 64 as the applied material 64 is applied to the surface 54. For example and without limitation, the fastener protection cap 1 may shield and protect the nut 58 and/or the bolt 56 from a sandblasting material 64 as it is forcefully applied to the surface 54 preparatory to painting and/or other treatment of the surface 54. The fastener protection cap 1 may protect a nut 58 which is coated with polytetrafluoroethylene (PTFE, or TEFLON®), or other coating material from damage during the sandblasting process. In some applications, the fastener protection cap 1 may shield the nut 58 and/or the bolt 56 from an applied material 64 such as paint during application of the paint to the surface 54.

Referring next to FIGS. 3-12 of the drawings, the fastener protection cap 1 may include a cap wall 2. The cap wall 2 may have at least one side cap wall portion 3. In some embodiments, the cap wall 2 may have a singular side cap wall portion 3 which may be generally elongated and cylindrical in shape. In other embodiments, the cap wall 2 may have multiple discrete side cap wall portions 3 which may form a polygonal shape in cross-section, as will be hereinafter further described. The cap wall 2 may be fabricated of plastic, metal, rubber, composite materials and/or other materials which are consistent with the functional requirements of the fastener protection cap 1.

The side cap wall portion 3 of the cap wall 2 may have a first wall end 4 and second wall end 5 which is opposite the first wall end 4. An end cap wall portion 10 may close the first wall end 4. As illustrated in FIGS. 9 and 10, a cap interior 14 may be formed by and between the side cap wall portion 3 and the end cap wall portion 10 of the cap wall 2. The cap interior 14 may be suitably sized and configured to accommodate the nut 58 and/or bolt 56 or at least a portion of some other mechanical fastener 55, as illustrated in FIGS. 11 and 12 and will be hereinafter described.

At least one wall bevel 6 may be provided at the second wall end 5 of the side cap wall portion 3. In some embodiments, a pair of spaced-apart wall bevels 6 may be provided at the second wall end 5 of the side cap wall portion 3. Accordingly, in typical application of the fastener protection cap 1, as illustrated in FIGS. 11 and 12 and will be hereinafter further described, the wall bevel or bevels 6 of the side cap wall portion 3 may engage the surface 54 to which the applied material 64 is to be applied. The wall bevel or bevels 6 may thus form a space or spaces 62 between the second wall end 5 of the side cap wall portion 3 and the surface 54 to facilitate application of the applied material 64 to the surface 54 as close as possible to the nut 58 and/or bolt 56, without applying the applied material 64 to the nut 58 and/or bolt 56.

As further illustrated in FIGS. 9 and 10, in some embodiments, the cap wall 2 may be fitted with at least one cap magnet 18, 22. A first end cap magnet 18 may be provided on the end cap wall portion 10 of the cap wall 2 inside the cap interior 14. As illustrated in FIGS. 11 and 12, the first end cap magnet 18 may magnetically attract the bolt 56 and/or nut 58 of the mechanical fastener 55 to magnetically secure the fastener protection cap 1 on the nut 58. Additionally or alternatively, at least one second end cap magnet 22 may be provided on the side cap wall portion 3 inside the cap interior 14 at the second wall end 5 of the side cap wall portion 3. In some embodiments, one or more of the second end cap magnets 22 may line the interior surface or surfaces of the side cap wall portion or portions 3. The second end cap magnet or magnets 22 may include multiple, discrete magnet faces 23. The magnet faces 23 of the second end cap magnet or magnets 22 may correspond in size and position to the respective nut faces 59 (FIGS. 11 and 12) on the nut 58 of the mechanical fastener 55. Accordingly, the magnet faces 23 on the second end cap magnet 22 may magnetically engage the respective nut faces 59 on the nut 58 to magnetically secure the fastener protection cap 1 on the nut 58.

As further illustrated in FIGS. 9-12, in some embodiments, at least one pressure tab 26 may protrude from the interior surface of the side cap wall portion 3 into the cap interior 14 of the cap wall 2. In some embodiments, multiple pressure tabs 26 may protrude from the side cap wall portion 3 in spaced-apart relationship to each other around the cap wall 2. Accordingly, when the fastener protection cap 1 is deployed in place on the nut 58, as illustrated in FIGS. 11 and 12, the pressure tabs 26 may engage respective nut faces 59 on the nut 58 to secure the fastener protection cap 1 on the nut 58.

In some embodiments, at least one cap handle 30 may be provided on the cap wall 2. The cap handle 30 may be provided on the end cap wall portion 10 of the cap wall 2. In some embodiments, the cap handle 30 may include at least one finger ring. Accordingly, a user can place the fastener protection cap 1 on and remove the fastener protection cap 1 from the nut 58 by grasping the cap removal handle 30.

Referring next to FIGS. 1, 2, 1 and 12 of the drawings, in typical application, at least one fastener protection cap 1 may shield at least a portion of at least one fastener 55 which may protrude from a surface 54 to be treated from at least one applied material 64 as the applied material 64 is applied to the surface 54. Accordingly, each fastener protection cap 1 may be deployed in place on each corresponding nut 58 of each mechanical fastener 55. The first end cap magnet 18 may magnetically attract the nut 58 and/or the bolt 56 on which the nut 58 is threaded to secure the fastener protection cap 1 in place on the nut 58. Additionally or alternatively, the second end cap magnet 22 may magnetically engage the nut 58. The magnet faces 23 on the second end cap magnet 22 may magnetically engage the respective nut faces 59 on the nut 58 to achieve a secure fit of the fastener protection cap 1 on the nut 58. In some embodiments, the pressure tab or tabs 26 on the interior surface of the side cap wall portion 3 may engage the nut 58 to additionally secure the fastener protection cap 1 on the nut 58. As illustrated in FIGS. 11 and 12, the wall bevel or bevels 6 at the second wall end 5 of the side cap wall portion 3 may be placed in abutment against the surface 54 to be treated. Accordingly, the area of the surface 54 which is immediately adjacent to the nut 58 may be exposed through the space 62 which is formed between the surface 54 and the second wall end 5 of the side cap wall portion 3 of the cap wall 2.

As further illustrated in FIGS. 11 and 12, the applied material 64 may next be applied to the surface 54. In some applications, the applied material 64 may include a sandblasting material which blasts and treats the surface 54 preparatory to painting or application of other coating to the surface 54. In other applications, the applied material 64 may include paint and/or other coating which may be applied to the surface 54. The applied material 64 may be forcefully applied to the surface 54. Accordingly, the first end cap magnet 18, the second end cap magnet 22 and/or the pressure tabs 26 may secure the fastener protection cap 1 on the nut 58 with sufficient strength to withstand the application force of the applied material 64 and prevent the fastener protection cap 1 from being inadvertently dislodged from the nut 58 during application of the applied material 64. The cap wall 2 of the fastener protection cap 1 prevents or at least minimizes contact of the applied material 64 with the nut 58. This expedient may be particularly advantageous under circumstances in which the nut 58 is coated with polytetrafluoroethylene (PTFE), or TEFLON®, in which case the fastener protection cap 1 protects the PTFE coating from damage during the sandblasting operation. Due to engagement of the wall bevel or bevels 6 with the surface 54, the applied material 64 can be applied to the surface 54 in close proximity to the nut 58 through the space 62 between the second wall end 5 of the side cap wall portion 3 and the surface 54 to achieve a uniform application of the applied material 64 to the surface 54 without application of the applied material 64 to the nut 58. In some applications, after initial application of the applied material 64 to the surface 54, the fastener protection cap 1, which may be initially oriented on the nut 58 as illustrated in FIG. 11, may be selectively detached from the nut 58, rotated 90 degrees and again deployed on the nut 58, such as to the position illustrated in FIG. 12, to readjust the position of the wall bevels 6 on the surface 54 and facilitate uniform application of the applied material 64 to the surface 54 as close as possible to all sides or nut faces 59 on the nut 58 without applying the applied material 64 to the nut 58. After the applied material 64 has been applied to the surface 54, the fastener protection cap 1 can be removed from the nut 58 by manually grasping and pulling the cap removal handle 30.

Referring next to FIGS. 13-19 of the drawings, an alternative illustrative embodiment of the fastener protection cap is generally indicated by reference numeral 101. In the fastener protection cap 101, elements which are analogous to the respective elements of the fastener protection cap 1 that was heretofore described with respect to FIGS. 1-12 are designated by the same respective numerals in the 101-199 series in FIGS. 13-19. The cap wall 102 of the fastener protection cap 101 may have multiple, discrete side cap wall portions 103. In some embodiments, the cap wall 102 may have six side cap wall portions 103 which correspond to the respective typically six nut faces 59 on the hex nut 58. As illustrated in FIG. 15, the second end cap magnet 122 may have magnet faces 123 which correspond in position to the respective side cap wall portions 103 of the cap wall 102. Application of the fastener protection cap 101 may be as was heretofore described with respect to application of the fastener protection cap 1 in FIGS. 1, 2, 11 and 12.

Figure 20:
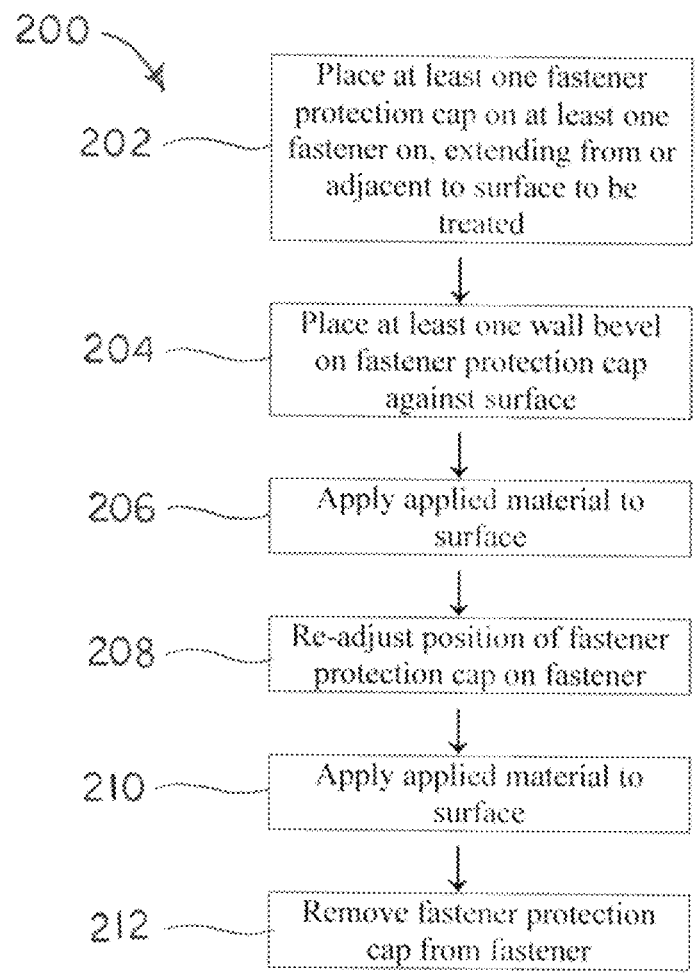
FIG. 20 is a flow diagram of an illustrative embodiment of the fastener protection methods.

Referring next to FIG. 20 of the drawings, a flow diagram of an illustrative embodiment of the fastener protection methods is generally indicated by reference numeral 200. At Step 202, at least one fastener protection cap may be placed on at least one fastener extending from, on or adjacent to a surface to be treated. The fastener protection cap may include a cap wall with at least one side cap wall portion having a first wall end and a second wall end and an end cap wall portion at the first wall end, and a cap interior defined by the cap wall. The cap interior may accommodate the mechanical fastener. At least one wall bevel may be provided at the second wall end of the cap wall.

At Step 204, at least one wall bevel of the fastener protection cap may be placed against the surface to be treated. Accordingly, the wall bevel or bevels may thus form a space or spaces between the second wall end of the side cap wall portion of the cap wall and the surface to facilitate application of the applied material to the surface as close as possible to the fastener without applying the applied material to the fastener. At Step 206, the applied material may be applied to the surface. The fastener protection cap may shield or protect the fastener from the applied material. At Step 208, the position of the fastener protection cap on the fastener may be re-adjusted. At Step 210, the applied material may again be applied to the surface to facilitate uniform application of the applied material to the surface as close as possible to all sides of the fastener without applying the applied material to the fastener. At Step 212, the fastener protection cap may be removed from the fastener.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A fastener protection cap, comprising:
   a cap wall including at least one side cap wall portion having a first wall end and a second wall end, and an end cap wall portion at the first wall end;
   a cap interior defined by the cap wall, the cap interior sized and configured to accommodate at least a portion of a mechanical fastener;
   a first end cap magnet carried by the end cap wall portion of the cap wall inside the cap interior;
   a second end cap magnet carried by the side cap wall portion inside the cap interior at the second wall end; and
   at least one wall bevel at the second wall end of the cap wall.

2. The fastener protection cap of claim 1 wherein the at least one side cap wall portion comprises a single cylindrical side cap wall portion.

3. The fastener protection cap of claim 1 wherein the at least one side cap wall portion comprises a plurality of discrete side cap wall portions.

4. The fastener protection cap of claim 3 wherein the plurality of side cap wall portions comprises six side cap wall portions.

5. The fastener protection cap of claim 1 wherein the second end cap magnet comprises a plurality of discrete magnet faces.

6. The fastener protection cap of claim 1 further comprising at least one cap handle carried by the cap wall.

7. The fastener protection cap of claim 6 wherein the at least one cap handle is carried by the end cap wall portion of the cap wall.

8. The fastener protection cap of claim 6 wherein the at least one cap handle comprises at least one finger ring.

9. A method of shielding at least one fastener on, adjacent to or protruding from a surface to be treated from at least one applied material applied to the surface, comprising:

placing at least one fastener protection cap on the at least one fastener, the at least one fastener protection cap including:

a cap wall including at least one side cap wall portion having a first wall end and a second wall end, and an end cap wall portion at the first wall end;

a cap interior defined by the cap wall, the cap interior accommodates at least a portion of the at least one mechanical fastener;

a first end cap magnet carried by the end cap wall portion of the cap wall inside the cap interior;

a second end cap magnet carried by the side cap wall portion inside the cap interior at the second wall end; and at least one wall bevel at the second wall end of the cap wall;

placing the at least one wall bevel against the surface to be treated; and applying the applied material to the surface.

10. The method of claim 9 further comprising readjusting a position of the at least one fastener protection cap on the at least one fastener after applying the applied material to the surface, and again applying the applied material to the surface.

11. The method of claim 9 wherein placing at least one fastener protection cap on the at least one fastener comprises placing at least one fastener protection cap having at least one cap removal handle carried by the cap wall on the at least one fastener, and further comprising removing the at least one fastener protection cap from the at least one fastener by grasping the at least one cap removal handle.

* * * * *